US009345267B2

(12) United States Patent
Torrence et al.

(10) Patent No.: US 9,345,267 B2
(45) Date of Patent: *May 24, 2016

(54) ORAL POUCH PRODUCT WITH FLAVORED WRAPPER

(71) Applicant: Philip Morris USA Inc., Richmond, VA (US)

(72) Inventors: Karen M. Torrence, Chester, VA (US); Warren D. Winterson, Richmond, VA (US)

(73) Assignee: PHILIP MORRIS USA INC., Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/719,525

(22) Filed: May 22, 2015

(65) Prior Publication Data

US 2015/0250228 A1  Sep. 10, 2015

Related U.S. Application Data

(63) Continuation of application No. 14/095,452, filed on Dec. 3, 2013, now Pat. No. 9,061,824, which is a continuation of application No. 12/071,772, filed on Feb. 26, 2008, now Pat. No. 8,616,221.

(60) Provisional application No. 60/903,848, filed on Feb. 28, 2007.

(51) Int. Cl.
| | |
|---|---|
| *A24B 15/00* | (2006.01) |
| *A24B 13/00* | (2006.01) |
| *A23L 1/212* | (2006.01) |
| *A24B 15/16* | (2006.01) |
| *B65D 85/804* | (2006.01) |
| *B65B 29/02* | (2006.01) |
| *B65B 43/02* | (2006.01) |
| *B65B 51/10* | (2006.01) |

(52) U.S. Cl.
CPC ............... *A24B 13/00* (2013.01); *A23L 1/212* (2013.01); *A24B 15/16* (2013.01); *B65B 29/02* (2013.01); *B65B 43/02* (2013.01); *B65B 51/10* (2013.01); *B65D 85/804* (2013.01); *B65D 85/8043* (2013.01); *Y02W 90/12* (2015.05)

(58) Field of Classification Search
None
See application file for complete search history.

(56) References Cited

U.S. PATENT DOCUMENTS

| | | | |
|---|---|---|---|
| 307,537 | A | 11/1884 | Foulks |
| 1,234,279 | A | 7/1917 | Buchanan |
| 1,376,586 | A | 5/1921 | Schwartz |
| 1,992,152 | A | 2/1935 | Yeates |
| 2,306,400 | A | 12/1942 | Menzel |
| 2,313,696 | A | 3/1943 | Yates |
| 2,318,101 | A | 5/1943 | Rose |
| 2,330,361 | A | 9/1943 | Howard |
| 2,528,778 | A | 11/1950 | Piazze |
| 3,067,068 | A | 12/1962 | Finberg |
| 3,162,199 | A | 12/1964 | Moll, Jr. |
| 3,174,889 | A | 3/1965 | Anderson et al. |
| 3,188,265 | A | 6/1965 | Charbonneau et al. |
| 3,369,551 | A | 2/1968 | Carroll |
| 3,415,286 | A | 12/1968 | Arnold et al. |
| 3,600,807 | A | 8/1971 | Sipos |
| 3,607,299 | A | 9/1971 | Bolt |
| 3,642,492 | A | 2/1972 | Arndt |
| 3,692,536 | A | 9/1972 | Fant |
| 3,757,798 | A | 9/1973 | Lambert |
| 3,846,569 | A | 11/1974 | Kaplan |
| 3,932,192 | A | 1/1976 | Nakashio et al. |
| 4,218,286 | A | 8/1980 | Jones et al. |
| 4,347,857 | A | 9/1982 | Boden et al. |
| 4,545,392 | A | 10/1985 | Sensabaugh et al. |
| 4,565,702 | A | 1/1986 | Morley et al. |
| 4,607,479 | A | 8/1986 | Linden |
| 4,624,269 | A | 11/1986 | Story et al. |
| 4,660,577 | A | 4/1987 | Sensabaugh et al. |
| 4,703,765 | A | 11/1987 | Paules et al. |
| 4,797,287 | A | 1/1989 | Pich et al. |
| 4,880,697 | A | 11/1989 | Caldwell et al. |
| 4,892,483 | A | 1/1990 | Douglas, Jr. |
| 4,917,161 | A | 4/1990 | Townend |
| 5,127,208 | A | 7/1992 | Custer et al. |
| 5,167,244 | A | 12/1992 | Kjerstad |
| 5,174,088 | A | 12/1992 | Focke et al. |

(Continued)

FOREIGN PATENT DOCUMENTS

| | | |
|---|---|---|
| EP | 0 212 234 A2 | 7/1986 |
| EP | 0 145 499 B1 | 4/1989 |

(Continued)

OTHER PUBLICATIONS

International Preliminary Report on Patentability dated Aug. 28, 2007 for PCT/IB2006/001114.
International Preliminary Report on Patentability dated Oct. 30, 2007 for PCT/IB2006/001611.
International Search Report and Written Opinion dated Sep. 12, 2008 for PCT/IB2008/001378.
International Preliminary Report on Patentability mailed Dec. 16, 2008 for PCT/IB2006/002680.
International Preliminary Report on Patentability issued Dec. 11, 2009 for PCT/IB2008/002598.
International Preliminary Report on Patentability issued Jan. 19, 2010 for PCT/IB2008/002682.
International Preliminary Report on Patentability issued Jan. 19, 2010 for PCT/IB2008/002694.

(Continued)

*Primary Examiner* — Michael H Wilson
*Assistant Examiner* — Dionne Walls Mayes
(74) *Attorney, Agent, or Firm* — Buchanan Ingersoll & Rooney PC

(57) ABSTRACT

Provided is an oral pouch flavor product with a fibrous flavored wrapper that encloses an inner filling material. Preferably, the fibrous flavored wrapper includes embedded flavorants. The fibrous flavored wrapper may also include a softening agent, colorants, and/or browning inhibitors. The inner material may include non-tobacco, plant material fibers and preferably has a low moisture content so as to prevent the need for preservatives or refrigeration.

19 Claims, 1 Drawing Sheet

(56) References Cited

U.S. PATENT DOCUMENTS

| | | | |
|---|---|---|---|
| 5,186,185 A | 2/1993 | Mashiko et al. |
| 5,211,985 A | 5/1993 | Shirley, Jr. et al. |
| 5,240,016 A | 8/1993 | Nichols et al. |
| 5,263,999 A | 11/1993 | Baldwin et al. |
| 5,346,734 A | 9/1994 | Wydick, Jr. |
| 5,348,027 A | 9/1994 | Barnes et al. |
| 5,372,149 A | 12/1994 | Roth et al. |
| 5,387,416 A | 2/1995 | White et al. |
| 5,389,389 A | 2/1995 | Beck |
| 5,525,351 A | 6/1996 | Dam |
| 5,549,906 A | 8/1996 | Santus |
| 5,601,716 A | 2/1997 | Heinrich et al. |
| 5,603,592 A | 2/1997 | Sadri et al. |
| 5,724,997 A | 3/1998 | Smith et al. |
| 5,726,161 A | 3/1998 | Whistler |
| 5,773,062 A | 6/1998 | Cirigliano et al. |
| 5,806,408 A | 9/1998 | DeBacker et al. |
| 5,829,453 A | 11/1998 | White et al. |
| 5,921,955 A | 7/1999 | Mazer et al. |
| 5,927,052 A | 7/1999 | Nippes et al. |
| 5,997,691 A | 12/1999 | Gautam et al. |
| 6,135,120 A | 10/2000 | Löfman |
| 6,143,316 A | 11/2000 | Hayden et al. |
| 6,146,655 A | 11/2000 | Ruben |
| 6,162,516 A | 12/2000 | Derr |
| 6,280,761 B1 | 8/2001 | Santus |
| 6,287,612 B1 | 9/2001 | Mandava et al. |
| 6,325,859 B1 | 12/2001 | De Roos et al. |
| 6,383,475 B1 | 5/2002 | Meyers et al. |
| 6,414,033 B1 | 7/2002 | Sceusa |
| 6,444,253 B1 | 9/2002 | Conklin et al. |
| 6,455,068 B1 | 9/2002 | Licari et al. |
| D489,606 S | 5/2004 | Löfman |
| 6,871,473 B1 | 3/2005 | Dutt et al. |
| 6,895,974 B2 | 5/2005 | Peele et al. |
| 6,942,848 B2 | 9/2005 | Nelson et al. |
| 6,958,429 B2 | 10/2005 | Bruhn et al. |
| 6,982,093 B2 | 1/2006 | Licari |
| 6,984,376 B2 | 1/2006 | Stephenson et al. |
| 7,030,092 B1 | 4/2006 | Levine |
| 7,032,601 B2 | 4/2006 | Atchley et al. |
| 7,052,725 B2 | 5/2006 | Chang et al. |
| 7,090,858 B2 | 8/2006 | Jayaraman |
| 7,186,701 B2 | 3/2007 | Kubota et al. |
| D568,576 S | 5/2008 | Neidle et al. |
| D585,626 S | 2/2009 | Chappell, Sr. et al. |
| 7,584,843 B2 | 9/2009 | Kutsch et al. |
| 8,616,221 B2* | 12/2013 | Torrence et al. ............... 131/352 |
| 9,061,824 B2* | 6/2015 | Torrence et al. |
| 2002/0012689 A1 | 1/2002 | Stillman |
| 2002/0170567 A1 | 11/2002 | Rizzotto et al. |
| 2003/0070687 A1 | 4/2003 | Atchley et al. |
| 2003/0109492 A1 | 6/2003 | Loftsson |
| 2003/0224090 A1 | 12/2003 | Pearce et al. |
| 2004/0015756 A1 | 1/2004 | Chiu et al. |
| 2004/0018293 A1 | 1/2004 | Popplewell et al. |
| 2004/0037879 A1 | 2/2004 | Adusumilli et al. |
| 2004/0118421 A1 | 6/2004 | Hodin et al. |
| 2004/0123873 A1 | 7/2004 | Calandro et al. |
| 2004/0145261 A1 | 7/2004 | Ganter et al. |
| 2004/0191322 A1 | 9/2004 | Hansson |
| 2004/0191366 A1 | 9/2004 | Mangos et al. |
| 2004/0202698 A1 | 10/2004 | Ramji et al. |
| 2004/0234479 A1 | 11/2004 | Schleifenbaum et al. |
| 2004/0247649 A1 | 12/2004 | Pearce et al. |
| 2004/0247744 A1 | 12/2004 | Pearce et al. |
| 2004/0247746 A1 | 12/2004 | Pearce et al. |
| 2005/0000531 A1 | 1/2005 | Shi |
| 2005/0003048 A1 | 1/2005 | Pearce et al. |
| 2005/0034738 A1 | 2/2005 | Whalen |
| 2005/0061339 A1 | 3/2005 | Hansson et al. |
| 2005/0100640 A1 | 5/2005 | Pearce |
| 2005/0172976 A1 | 8/2005 | Newman et al. |
| 2005/0178398 A1 | 8/2005 | Breslin et al. |
| 2005/0210615 A1 | 9/2005 | Shastry et al. |
| 2005/0241656 A1 | 11/2005 | Kennison |
| 2005/0244521 A1 | 11/2005 | Strictland et al. |
| 2005/0287249 A1 | 12/2005 | Shukla et al. |
| 2006/0039973 A1 | 2/2006 | Aldritt et al. |
| 2006/0073190 A1 | 4/2006 | Carroll et al. |
| 2006/0118589 A1 | 6/2006 | Arnarp et al. |
| 2006/0144412 A1 | 7/2006 | Mishra et al. |
| 2006/0174901 A1 | 8/2006 | Karles et al. |
| 2006/0191548 A1 | 8/2006 | Strickland et al. |
| 2006/0204598 A1 | 9/2006 | Thompson |
| 2006/0228431 A1 | 10/2006 | Eben et al. |
| 2006/0275344 A1 | 12/2006 | Mody et al. |
| 2007/0000505 A1 | 1/2007 | Zhuang et al. |
| 2007/0012328 A1 | 1/2007 | Winterson et al. |
| 2007/0048431 A1 | 3/2007 | Budwig et al. |
| 2007/0077307 A1 | 4/2007 | Rosenberg et al. |
| 2007/0095356 A1 | 5/2007 | Winterson et al. |
| 2007/0107747 A1 | 5/2007 | Hill et al. |
| 2007/0122526 A1 | 5/2007 | Sweeney et al. |
| 2007/0186941 A1 | 8/2007 | Holton, Jr. et al. |
| 2007/0186942 A1 | 8/2007 | Strckland et al. |
| 2007/0186943 A1 | 8/2007 | Strickland et al. |
| 2007/0186944 A1 | 8/2007 | Strickland et al. |
| 2007/0190157 A1 | 8/2007 | Sanghvi et al. |
| 2007/0207239 A1 | 9/2007 | Neidle et al. |
| 2007/0261707 A1 | 11/2007 | Winterson et al. |
| 2007/0267033 A1 | 11/2007 | Mishra et al. |
| 2007/0298061 A1 | 12/2007 | Boghani et al. |
| 2008/0014303 A1 | 1/2008 | Jacops et al. |
| 2008/0029110 A1 | 2/2008 | Dube et al. |
| 2008/0029116 A1 | 2/2008 | Robinson et al. |
| 2008/0029117 A1 | 2/2008 | Mua et al. |
| 2008/0081071 A1* | 4/2008 | Sanghvi et al. ............... 424/484 |
| 2008/0108710 A1* | 5/2008 | Prakash et al. ............... 514/783 |
| 2008/0166395 A1 | 7/2008 | Roush |
| 2008/0173317 A1 | 7/2008 | Robinson et al. |
| 2008/0196730 A1 | 8/2008 | Engstrom et al. |
| 2008/0202536 A1 | 8/2008 | Torrence et al. |
| 2008/0302682 A1 | 12/2008 | Engstrom et al. |
| 2008/0308115 A1 | 12/2008 | Zimmermann |
| 2008/0317911 A1 | 12/2008 | Schleef et al. |
| 2009/0004329 A1 | 1/2009 | Gedevanishvili et al. |
| 2009/0022856 A1 | 1/2009 | Cheng et al. |
| 2009/0022917 A1 | 1/2009 | Gedevanishvili et al. |
| 2009/0025738 A1 | 1/2009 | Mua et al. |
| 2009/0025739 A1 | 1/2009 | Brinkley et al. |
| 2009/0025740 A1 | 1/2009 | Chappell, Sr. et al. |
| 2009/0025741 A1 | 1/2009 | Crawford et al. |
| 2009/0035414 A1 | 2/2009 | Cheng et al. |
| 2009/0074911 A1* | 3/2009 | Boghani et al. ......... A23G 4/066 426/5 |
| 2009/0126746 A1 | 5/2009 | Strickland et al. |
| 2010/0218779 A1 | 9/2010 | Zhuang et al. |
| 2010/0300464 A1 | 12/2010 | Gee et al. |
| 2010/0300465 A1 | 12/2010 | Zimmermann et al. |

FOREIGN PATENT DOCUMENTS

| | | | |
|---|---|---|---|
| EP | 0 352 107 A2 | 1/1990 |
| EP | 0 483 500 A1 | 5/1992 |
| EP | 0 422 898 B1 | 9/1994 |
| EP | 0 599 425 B1 | 10/1997 |
| EP | 1 010 639 A1 | 6/2000 |
| EP | 1 118 274 A2 | 7/2001 |
| GB | 725764 A | 3/1955 |
| GB | 924052 A | 4/1963 |
| GB | 1139684 A | 1/1969 |
| GB | 1350740 A | 4/1974 |
| GB | 2074838 A | 11/1981 |
| JP | 03-240665 A | 10/1991 |
| JP | 06-05496 U | 1/1994 |
| JP | 06-30752 A | 2/1994 |
| JP | 09-187266 A | 7/1997 |
| JP | 11-42723 A | 2/1999 |
| JP | 2009-523672 A | 6/2009 |
| RU | 47625 U1 | 9/2005 |
| WO | 94/25356 A1 | 11/1994 |
| WO | 97/45336 A1 | 12/1997 |
| WO | 99/40799 A1 | 8/1999 |

(56) References Cited

FOREIGN PATENT DOCUMENTS

| | | |
|---|---|---|
| WO | 00/57713 A1 | 10/2000 |
| WO | 01/70591 A1 | 9/2001 |
| WO | 02/080707 A1 | 10/2002 |
| WO | 03/028492 A1 | 4/2003 |
| WO | 03/030881 A1 | 4/2003 |
| WO | 2004/079445 A2 | 1/2004 |
| WO | 2004/052335 A1 | 6/2004 |
| WO | 2004/056219 A1 | 7/2004 |
| WO | 2004/058217 A2 | 7/2004 |
| WO | 2004/066986 A1 | 8/2004 |
| WO | 2004064811 A1 | 8/2004 |
| WO | 2005/027815 A1 | 3/2005 |
| WO | 2005/046363 A1 | 5/2005 |
| WO | 2005/077232 A2 | 8/2005 |
| WO | 2005/084446 A1 | 9/2005 |
| WO | 2006/004480 A1 | 1/2006 |
| WO | 2006/039487 A2 | 4/2006 |
| WO | 2006/065192 A1 | 6/2006 |
| WO | 2006/090290 A1 | 8/2006 |
| WO | 2006/105173 A2 | 10/2006 |
| WO | 2006/120570 A2 | 11/2006 |
| WO | 2006/127772 A2 | 11/2006 |
| WO | 2007/037962 A1 | 4/2007 |
| WO | 2007/057789 A2 | 5/2007 |
| WO | 2007/057791 A2 | 5/2007 |
| WO | 2007/082599 A1 | 7/2007 |
| WO | 2007/084587 A2 | 7/2007 |
| WO | 2007/104573 A2 | 9/2007 |
| WO | 2007/126361 A1 | 11/2007 |
| WO | 2008/016520 A2 | 2/2008 |
| WO | 2008/104891 A2 | 9/2008 |
| WO | 2008/042331 A2 | 10/2008 |
| WO | 2008/140372 A1 | 11/2008 |

OTHER PUBLICATIONS

International Preliminary Report on Patentability issued Jan. 19, 2010 for PCT/IB2008/002714.
International Preliminary Report on Patentability issued Jan. 19, 2010 for PCT/IB2008/002764.
International Search Report and Written Opinion mailed Jul. 25, 2006 for PCT/IB2006/001114.
Partial International Search Report dated Oct. 6, 2006 for PCT/IB2006/001611.
International Search Report and Written Opinion dated Feb. 27, 2007 for PCT/IB2006/002680.
International Search Report and Written Opinion dated Aug. 6, 2007 for PCT/IB2006/004077.
International Search Report and Written Opinion dated Jan. 30, 2009 for PCT/IB2008/002598.
International Search Report and Written Opinion mailed Feb. 25, 2009 for PCT/IB2008/002566.
International Search Report and Written Opinion mailed Mar. 13, 2009 for PCT/IB2008/002694.
International Search Report and Written Opinion mailed Mar. 24, 2009 for PCT/IB2008/002764.
International Search Report and Written Opinion mailed Mar. 25, 2009 for PCT/IB2008/002682.
International Search Report and Written Opinion mailed Mar. 31, 2009 for PCT/IB2008/002681.
International Search Report and Written Opinion mailed Jul. 17, 2009 for PCT/IB2008/002714.
U.S. Appl. No. 12/748,205, filed Mar. 26, 2010.
U.S. Appl. No. 12/789,125, filed May 27, 2010.
Official Action dated Oct. 19, 2011 for Russian Appln. No. 2009135801.
Official Action dated Sep. 21, 2012 for Japanese Appln. No. 2009-551285.
Nov. 5, 2013 Japanese Office Action issued in Japanese Patent Application No. 2009-551285 (with translation).
Satel, Sally M.D., "A Smokeless Alternative to Quitting," Apr. 6, 2004, The New York Times, Accessed Oct. 25, 2010; http://query.nytimes.com/gst/fullpage.html?res=9402EFD91E39F935A35757C0A9629C8B63.

* cited by examiner

ORAL POUCH PRODUCT WITH FLAVORED WRAPPER

CROSS REFERENCE TO RELATED APPLICATION

This application is a continuation application of application Ser. No. 14/095,452, entitled ORAL POUCH PRODUCT WITH FLAVORED WRAPPER, filed Dec. 3, 2013 which is a continuation application of application Ser. No. 12/071,772, filed Feb. 26, 2008 (now U.S. Pat. No. 8,616,221) which claims priority under 35 U.S.C. §119(e) to U.S. provisional Application No. 60/903,848, filed on Feb. 28, 2007, the entire content of each is incorporated herein by reference.

BACKGROUND

Typical oral pouch products include a paper or fabric pouch material enclosing tobacco or other food grade materials. The enclosed tobacco or other material provides flavor as the user sucks or manipulates the pouch, saliva mixes with the enclosed materials, and the flavors leach out of the pouch through pores.

Generally, the paper or fabric pouch does not have good flavor or mouth feel and is unsatisfying until saliva and juices from the enclosed material are released.

In addition, many pouch products have a moisture content that causes the product to require preservatives and/or refrigeration in order to maintain freshness. Refrigeration can be inconvenient and the use of preservatives is unattractive to many consumers.

Thus, there remains a need in the art for an oral product having a fabric or paper pouch that provides immediate oral gratification, and a low moisture content to prevent the need for refrigeration or the use of preservatives.

SUMMARY

Provided is an oral pouch product with a single layer, flavored wrapper. In a preferred embodiment, the oral pouch product includes a fibrous, flavored wrapper for enclosing an inner material. Preferably, the inner filling material includes a fibrous non-tobacco, plant material that is enclosed in the pouch. Once the flavor of the product has been consumed, the fibrous flavored wrapper is removed from the mouth and discarded.

Preferably, the fibrous flavored wrapper is made of a paper and/or fabric. Preferably, the fibrous flavored wrapper is non-disintegrable and/or non-dissolvable. Also preferably, the fibrous flavored wrapper allows the flavors of the inner filling material to leach out into the user's mouth as the user sucks and manipulates the oral pouch product.

In an embodiment, the paper and/or fabric is heat sealable so that once a portion of the inner filling material is placed on a first portion of the fibrous flavored wrapper, a second portion of the fibrous flavored wrapper can be positioned over the first portion of the flavored wrapper. The first portion and the second portion can be part of a single layer of fibrous material (e.g., the first and second layers can be part of a strip of paper of fabric or separate strips of such material). A seal, such as a heat seal or ultrasonic weld, is then formed between the two portions of flavored wrapper around the inner filling material. In another embodiment, the portions of flavored paper and/or fabric are adhered via adhesive or otherwise affixed together to form seams.

In a preferred embodiment, the fibrous flavored wrapper includes flavorants embedded therein that provide initial flavor to the user before the inner filling material mixes with saliva to release the flavors and juices from the inner filling material.

Preferably, the flavorants are applied to the fibrous pouch wrapper by spraying, coating, immersing, embossing, and/or dispersing. In an embodiment, the flavorants are added to the fibrous flavored wrapper in the form of spray dried flavors, essential oils, encapsulated flavors, coacervated flavors, suspensions, and/or solutions.

Preferably, when the flavorants applied to the fibrous pouch wrapper are encapsulated (e.g., microencapsulated beads), the flavorants also include controlled release mechanisms such as pH change, heat activation, or mechanical activation through manipulating or sucking. In addition, encapsulated flavorants can have coatings of various thicknesses so that the flavorants are released at varying rates to provide continuous flavor throughout use of the oral product.

In a preferred embodiment, the fibrous flavored wrapper also includes a browning inhibitor that inhibits discoloration of the flavored wrapper caused by the inner filling material prior to use. In another embodiment, food grade colorants can be added to the fibrous flavored wrapper to make a colored wrapper, apply patterns thereto, or identify the flavor of the inner filling material and flavored wrapper.

Also preferably, the fibrous flavored wrapper includes a softening agent so as to soften the fibrous flavored wrapper and provide a more comfortable mouth feel to the user. In an embodiment, the softening agent is selected from the group consisting of humectants, flavored oils, and combinations thereof.

In a preferred embodiment, the inner filling material includes fibrous, non-tobacco, plant material, which includes tea, spices, herbs, vegetables, food fibers, fruit and/or tea and botanical extracts. Preferably, the moisture content of the plant material is below about 15% by weight so as to avoid the need for preservatives and/or refrigeration.

DETAILED DESCRIPTION OF THE DRAWINGS

DETAILED DESCRIPTION

As described herein, an oral pouch product includes a single layer, fibrous flavored wrapper that forms a pouch. Preferably, the pouch is filled with an inner filling material including a fibrous non-tobacco, plant material.

Figure 1:
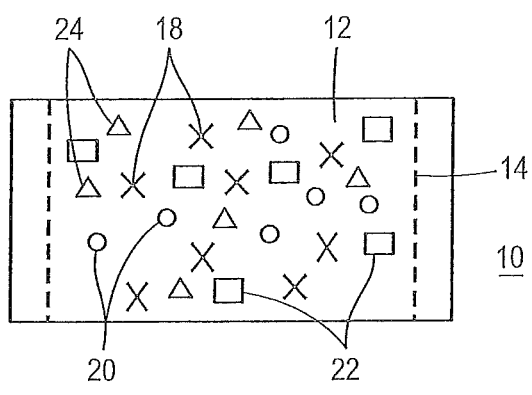
FIG. 1 is an illustration of an oral pouch product having a flavored wrapper.

In a preferred embodiment, as illustrated in FIG. 1, the oral pouch product 10 includes a fibrous flavored wrapper 12. The fibrous flavored wrapper 12 is formed into a pouch that contains an inner filling material and is sealed.

Preferably, the pouch product 10 has a rectangular or elliptical shape. Other preferred shapes for the pouch product 10 include any shape selected from the group consisting of polygons, squares, rectangles, circles, ovals, heart, star, half-moon, crescent, leaf shapes, and combinations thereof.

Figure 5:
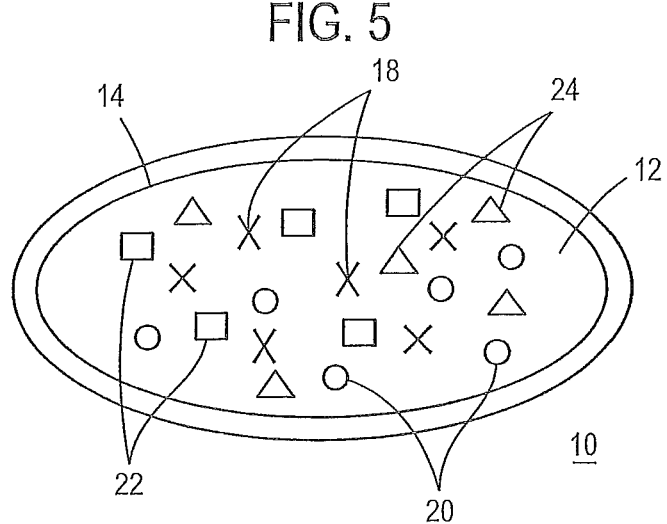
FIG. 5 is an illustration of another embodiment of an oral pouch product with a flavored wrapper.

In a preferred embodiment, the oral pouch product is sized and configured to fit inside the mouth, between a user's cheek and gum. Preferably, a rectangular shaped oral pouch product 10 is about 20 mm to about 35 mm long, about 10 mm to about 20 mm wide and about 3 mm to about 6 mm thick. In a preferred embodiment, the elliptical shaped oral pouch product, as illustrated in FIG. 5, has a major axis of about 20 mm to about 35 mm and a minor axis of about 10 mm to about 25 mm. Preferably, the elliptical shaped oral pouch product is about 3 mm to about 6 mm thick. The ellipse may be truncated along one or both axes. In a preferred embodiment, the oral product 10 weighs about 200 mg to about 600 mg per pouch regardless of the shape of the pouch product.

The fibrous pouch wrapper 12 may be a fabric and/or paper such as filter paper, papers used to construct tea bags, coffee filters, and the like. Preferably, the fibrous pouch material 12 is of the type suitable for contact with food, such as materials used for packaging and/or handling foods. Also preferably, the pouch material 12 is porous so that flavors and saliva can travel in and out of the pouch product 10 when in use.

Figure 2:
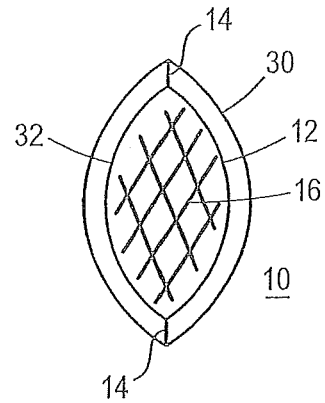
FIG. 2 is an illustration of a cross-sectional view of an oral pouch product having a flavored wrapper.

In a preferred embodiment, the fibrous pouch wrapper 12 is heat sealable. Preferably, the inner filling material 16 is placed between a first layer 30 and a second layer 32, as seen in FIG. 2, of the fibrous pouch wrapper 12. A seal 14 is formed between the two layers 30, 32 around the inner filling material to form the pouch product 10.

As illustrated in FIG. 1, the flavorants 18 are applied to the fibrous pouch wrapper 12 to provide immediate release of flavor once the oral flavor product 10 is placed in the user's mouth. Preferably, less than about 1 mg or up to about 100 mg of a flavorant 18 is added to the fibrous pouch material 12. Most preferably, the amount of flavor added to the pouch is less than about 1% or up to about 5% by weight of the pouch contents. The amount of flavorant added can depend on the potency of the flavorant being added.

Suitable flavorants 18 include any flavorants commonly used in foods, confections, or other oral products. Exemplary flavorants include, but are not limited to, berry flavors such as pomegranate, acai, raspberry, blueberry, strawberry, boysenberry, and/or cranberry. Other suitable flavorants include, without limitation, any natural or synthetic flavor or aroma, such as menthol, peppermint, spearmint, wintergreen, bourbon, scotch, whiskey, cognac, *hydrangea*, lavender, chocolate, licorice, citrus and other fruit flavors, such as apple, peach, pear, cherry, plum, orange, lime, grape, and grapefruit, gamma octalactone, vanillin, ethyl vanillin, breath freshener flavors, butter, rum, coconut, almond, pecan, walnut, hazelnut, french vanilla, macadamia, sugar cane, maple, cassis, caramel, banana, malt, espresso, kahlua, white chocolate, spice flavors such as cinnamon, clove, cilantro, basil, oregano, garlic, mustard, nutmeg, rosemary, thyme, tarragon, dill, sage, anise, and fennel, methyl salicylate, linalool, jasmine, coffee, olive oil, sesame oil, sunflower oil, bergamot oil, geranium oil, lemon oil, ginger oil, balsamic vinegar, rice wine vinegar, and red wine vinegar.

Preferably, the flavorants are applied to the fibrous flavored wrapper by spraying, coating, immersing, embossing, and/or dispersing. In an embodiment, the flavorants are added to the fibrous pouch in the form of spray dried flavors, essential oils, encapsulated flavors, coacervated flavors, suspensions, and/or solutions.

In a preferred embodiment, when the flavorants are encapsulated, the flavorants also include controlled release mechanisms such as pH change, heat activation, or mechanical activation through manipulating or sucking. In addition, encapsulated flavorants can have coatings of various thicknesses so that the flavorants are released at varying rates to provide continuous flavor throughout use of the oral product.

When the flavorants are applied as suspensions or solutions, the inner material is dried after application of the flavorants to a moisture content of less than about 15% by weight of the inner material (e.g. less than about 14%, less than about 13%, less than about 12%, less than about 11%, less than about 10%, less than about 9%, less than about 8%, less than about 7%, less than about 6%, less than about 5%, less than about 4%, less than about 3%, less than about 2%, less than about 1%). Preferably, drying is avoided when volatile flavorants with vapor pressures close to or below that of the solvent, of the solution, are used so that the flavorants are maintained in the pouch material 12.

Most preferably, the amount of flavorant applied to the pouch is such that drying is unnecessary because the inner material is not wetted by the flavorant. In an embodiment, the flavorant is applied to the fibrous pouch material prior to the insertion of the inner filling material to prevent wetting of the inner filling material.

Also preferably, the pouch contains fibrous plant material with a controlled moisture content so that its water activity (aw) is preferably below 0.65, but at least below 0.7 aw or a level determined sufficient to prevent mold growth, this value typically ranging between 0.6 aw and 0.7 aw.

In a preferred embodiment, the flavorants or other functional additives are applied to the fibrous pouch wrapper without increasing the moisture content of the pouch and pouch filler. Additional moisture renders the product unstable against microbial growth by increasing its water activity to a point where mold or bacteria can grow, resulting in a short life or the requirement the product contain preservatives or be refrigerated. Thus, it is preferred that the water activity level of the product is such that the product does not require preservatives or refrigeration to maintain freshness.

In a preferred embodiment, the fibrous pouch material 12 also includes a softening agent 20. Preferably, the softening agent 20 makes the pouch material 12 soft and pliable to provide better comfort to the user upon insertion in the mouth.

Suitable softening agents 20 include humectants, oils, and the like. Humectants include, without limitation, glycerin and propylene glycol. Oils include any flavored and/or natural oils such as, without limitation, olive oil, sesame oil, peanut oil, coconut oil, corn oil, grapeseed oil, walnut oil, safflower oil, soybean oil, and/or sunflower oil. In addition, oils that have been flavored with herbs may also be used as a softening agent 20. Preferably, the softening agent 20 is a pleasantly flavored oil that provides an additional layer of flavor to the user and/or acts as the flavorant. The softening agent 20 may be applied to the pouch material 12 by spraying, coating, immersing, embossing, or any other technique.

Often, pouch products turn beige or brown over time due to the enclosed material. Therefore, it is also preferable to treat the pouch material 12 with a browning inhibitor 22 such as that used to prevent fruits from turning brown. Preferred browning inhibitors 22 include, but are not limited to, antioxidants, vitamin E, vitamin C, calcium chloride, sodium hexametaphosphate, sodium bisulfite, and combinations thereof. The browning inhibitor 22 may be applied to the pouch material 12 by spraying, coating, immersing, embossing, or any other technique.

In a preferred embodiment, coloring agents 24 are included in the fibrous pouch material 12. One or more coloring agents 24 may change the color of the pouch to create designs, patterns, a trademark, or to signify pouch flavor. (i.e. purple to signify grape flavor) The coloring agent 24 may be used to dye the pouch material 12 or coloring agents 24 can be printed onto the pouch material 12.

In a preferred embodiment, as illustrated in FIG. 2, the oral pouch product includes an inner material 16 enclosed within the fibrous pouch material 12. Preferably, the inner material 16 includes non-tobacco, botanicals and/or non-tobacco botanical extracts.

As used herein, the term "botanical" includes anything derived from plants including, but not limited to, extracts, leaves, fibers, stems, roots, seeds, flowers, fruits, pollen, and the like.

Figure 3:
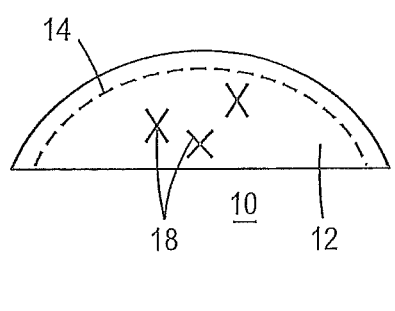
FIG. 3 is an illustration of an embodiment of an oral pouch product with a flavored wrapper.

As seen in FIG. 3, the pouch product 10 can be in a half-moon shape and can include a single sheet of pouch material 12 folded over to create a first layer and a second layer with the inner material between the layers. A single seal 14 can seal the inner material within the pouch 10.

Figure 4:
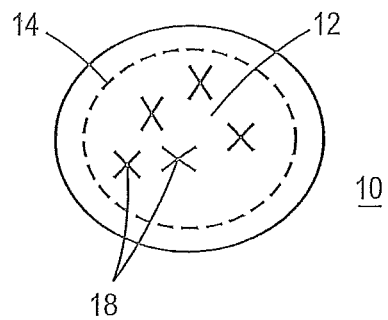
FIG. 4 is an illustration of an embodiment of an oral pouch product with a flavored wrapper.

As illustrated in FIG. 4, the pouch product 10 can be a circular pouch. The first layer and second layer can be separate pieces of pouch material 12 with the inner material placed therebetween. A single seal 14 circumscribes the enclosed inner material.

As illustrated in FIG. 5, the pouch product 10 is an elliptical shaped pouch. The pouch is made of a fibrous material 12. Seals 14 around the perimeter of the pouch hold the inner material within. The pouch material 12 includes flavorants 18, softening agents 20, browning inhibitors, 22 and/or coloring agents 24.

The examples provided below are exemplary and are not meant to limit any aspects of the embodiments disclosed herein.

EXAMPLE 1

About 4 mg of flavorant was added to a paper pouch wrapper weighing about 20 mg. About 450 mg of an inner material was placed inside the pouch. The pouch was sealed to hold the inner material within the pouch.

EXAMPLE 2

About 50 mg of canola oil was sprayed onto a paper pouch using an atomizer. The pouch weighed about 300 mg.

EXAMPLE 3

A solution of propylene glycol and 3 mg of flavorant was formed. The solution was added to a pouch material weighing about 20 mg. An inner material weighing about 450 mg was placed in the pouch. The pouch was sealed to retain the inner material within the pouch.

The pouch of Example 1 showed rapid release of flavor from the product upon initial placement in the mouth. The pouch of Example 2 was noticeably softer than the pouch of Example 1 due to the inclusion of the softening agent. The pouch of Example 3 used propylene glycol, a softening agent, and flavorants so as to provide better flavor and a softer pouch.

While the foregoing has been described in detail with reference to specific embodiments thereof, it will be apparent to one skilled in the art that various changes and modifications may be made, and equivalents thereof employed, without departing from the scope of the claims.

We claim:
1. An oral pouch product comprising:
 a porous single-layer, fibrous flavored wrapper including at least one embedded flavorant and at least one sealed edge forming a pouch; and
 a inner filling material including non-tobacco, plant material fibers enclosed in said pouch, the inner filling material having a moisture content of less than about 15% by weight of the inner filling material,
 wherein said fibrous flavored wrapper includes a browning inhibitor so as to inhibit discoloration of the wrapper, and
 wherein said browning inhibitor is sodium hexametaphosphate.

2. The oral pouch product of claim 1, wherein said fibrous flavored wrapper is made of paper.

3. The oral pouch product of claim 1, wherein said fibrous flavored wrapper includes a softening agent in an amount effective to soften the fibrous flavored wrapper.

4. The oral pouch product of claim 3, wherein said softening agent is a humectant.

5. The oral pouch product of claim 1, wherein said at least one flavorant comprises microencapsulated beads containing flavored oil.

6. The oral pouch product of claim 1, wherein said fibrous flavored wrapper includes colorants.

7. The oral pouch product of claim 1, wherein said inner filling material does not include preservatives.

8. The oral pouch product of claim 1, wherein said at least one flavorant is in the form of spray dried flavors, essential oils, encapsulated flavors, coacervated flavors, suspensions, and/or solutions.

9. The oral pouch product of claim 1, wherein said at least one flavorant comprises microencapsulated beads providing controlled release of the flavorants.

10. The oral pouch product of claim 1, wherein said at least one flavorant is present in an amount of about 0.1% to about 5% by weight of the inner filling material.

11. The oral pouch product of claim 1, wherein said pouch product weighs about 200 mg to about 600 mg.

12. The oral pouch product of claim 1, wherein said non-tobacco, plant material fibers include tea, spice, herb, fruit, and/or vegetable fibers.

13. The oral pouch product of claim 1, wherein said inner filling material has a water activity level in an amount of about 0.5 aw to about 0.75 aw.

14. The oral pouch product of claim 1, wherein said oral pouch product is a rectangular shaped pouch and has a length of about 20 mm to about 35 mm, a width of about 10 mm to about 20 mm, and a thickness of about 3 mm to about 6 mm.

15. The oral pouch product of claim 1, wherein said oral pouch product is elliptical shaped and has a major axis of about 20 mm to about 35 mm, a minor axis of about 10 mm to about 25 mm, and a thickness of about 3 mm to about 6 mm, and wherein said elliptical shaped pouch is truncated along at least one axis.

16. The oral pouch product of claim 1, wherein said at least one sealed edge forming a pouch is produced by a heat seal.

17. A method of making an oral pouch product comprising:
 forming a flavored wrapper by applying flavorants contained in microencapsulated beads to a single-layer, fibrous wrapper;
 forming the flavored wrapper into a pouch;
 filling said pouch with an inner filling material having a water activity of about 0.5 aw to about 0.75 aw; and
 applying a seal around said inner filling material to form an oral pouch product,
 wherein said single layer fibrous wrapper containing flavorants contained in microencapsulated beads includes sodium hexametaphosphate as a browning inhibitor so as to inhibit discoloration of the wrapper, and
 wherein said inner filling material includes non-tobacco, plant material fibers and is free of preservatives.

18. The method of claim 17, wherein said flavorants are applied to said fibrous flavored wrapper by spraying, coating, immersing, embossing, and/or dispersing.

19. The method of making an oral pouch product of claim 17, wherein said applying a seal around said inner material to form an oral pouch is achieved by heat sealing.

\* \* \* \* \*